Dec. 21, 1943. T. JACKSON 2,337,050
ENGINE INDUCTION SYSTEM
Filed June 17, 1942 3 Sheets-Sheet 2
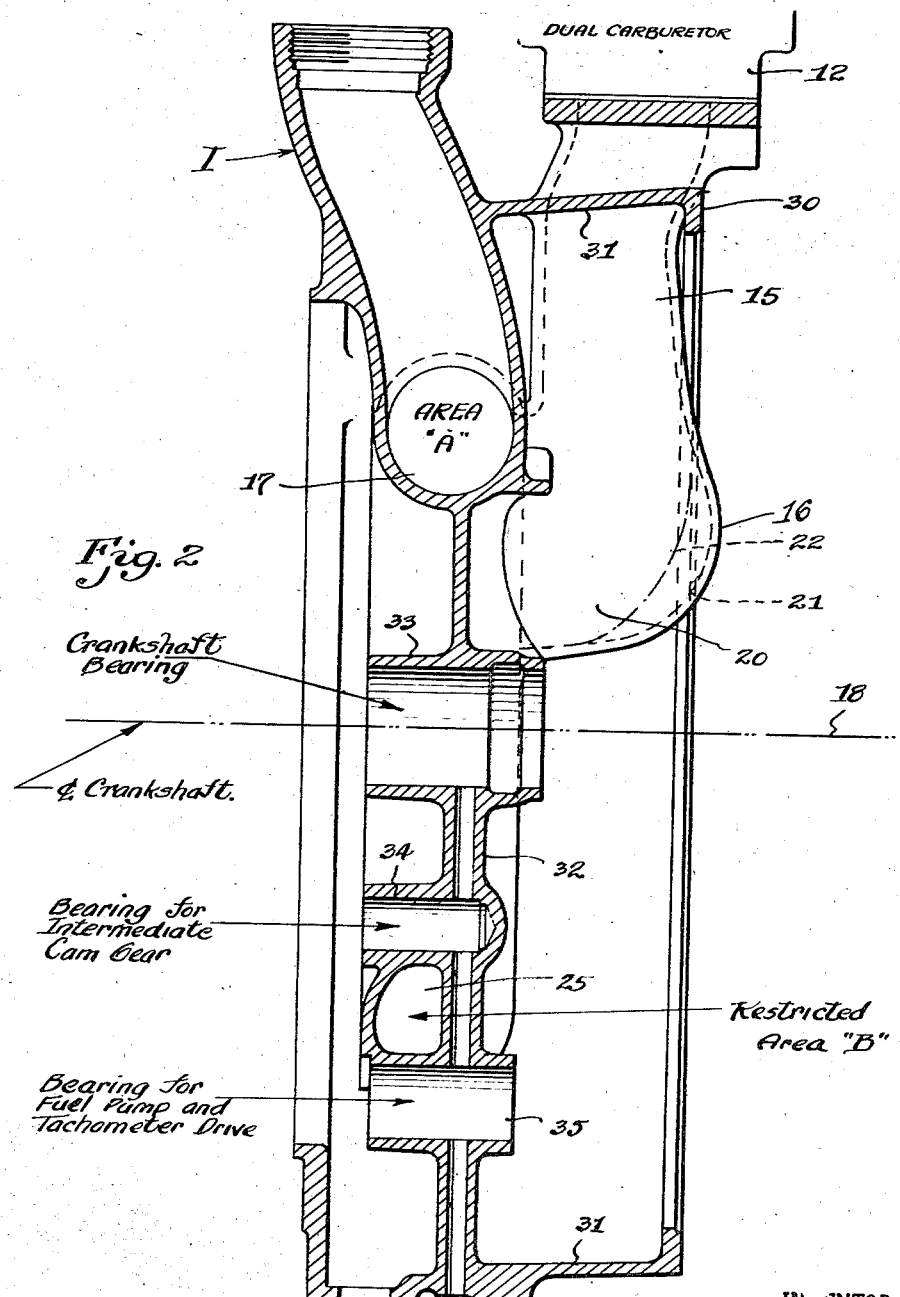

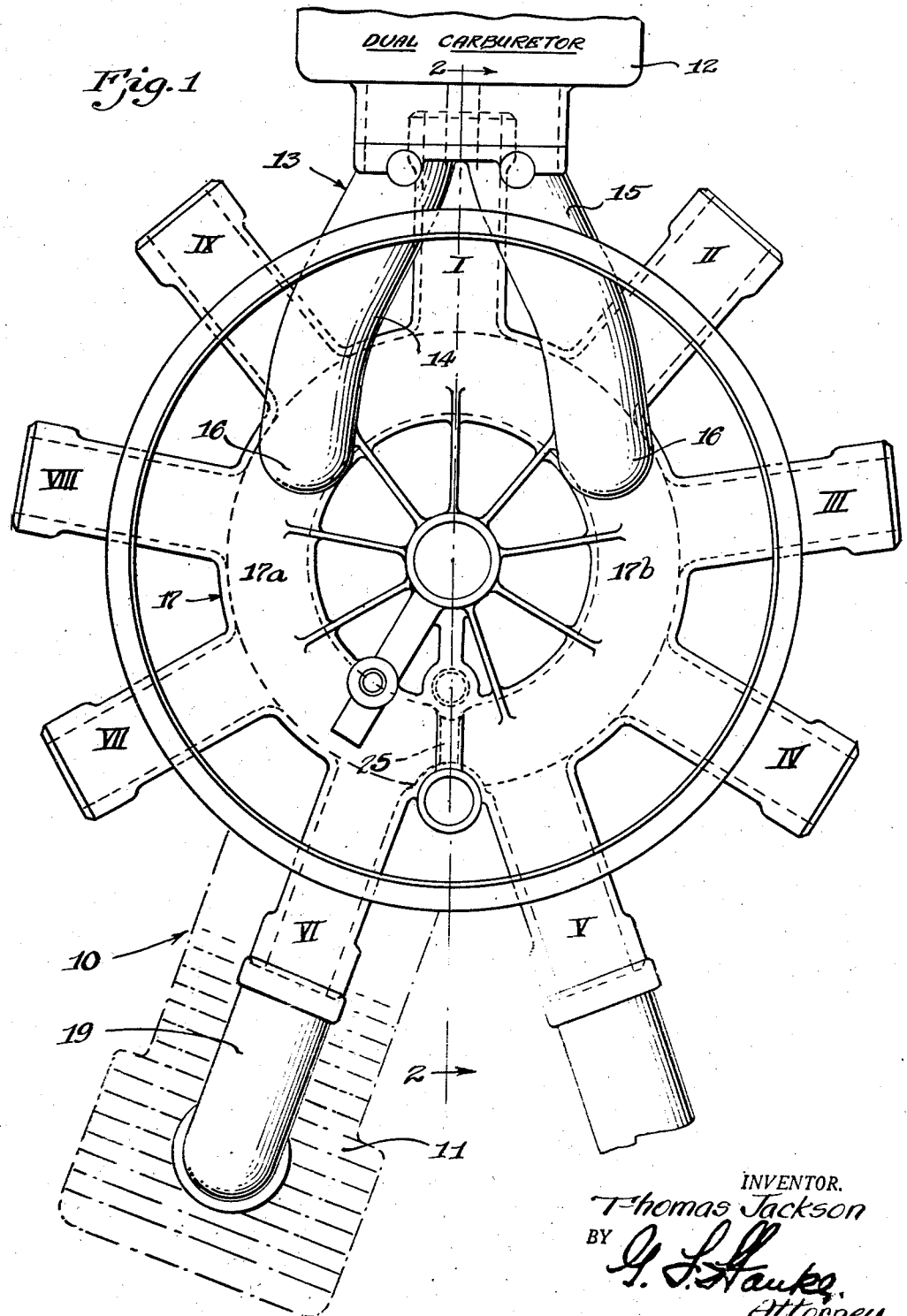

Dec. 21, 1943.　　　　T. JACKSON　　　　2,337,050
ENGINE INDUCTION SYSTEM
Filed June 17, 1942　　　3 Sheets-Sheet 3
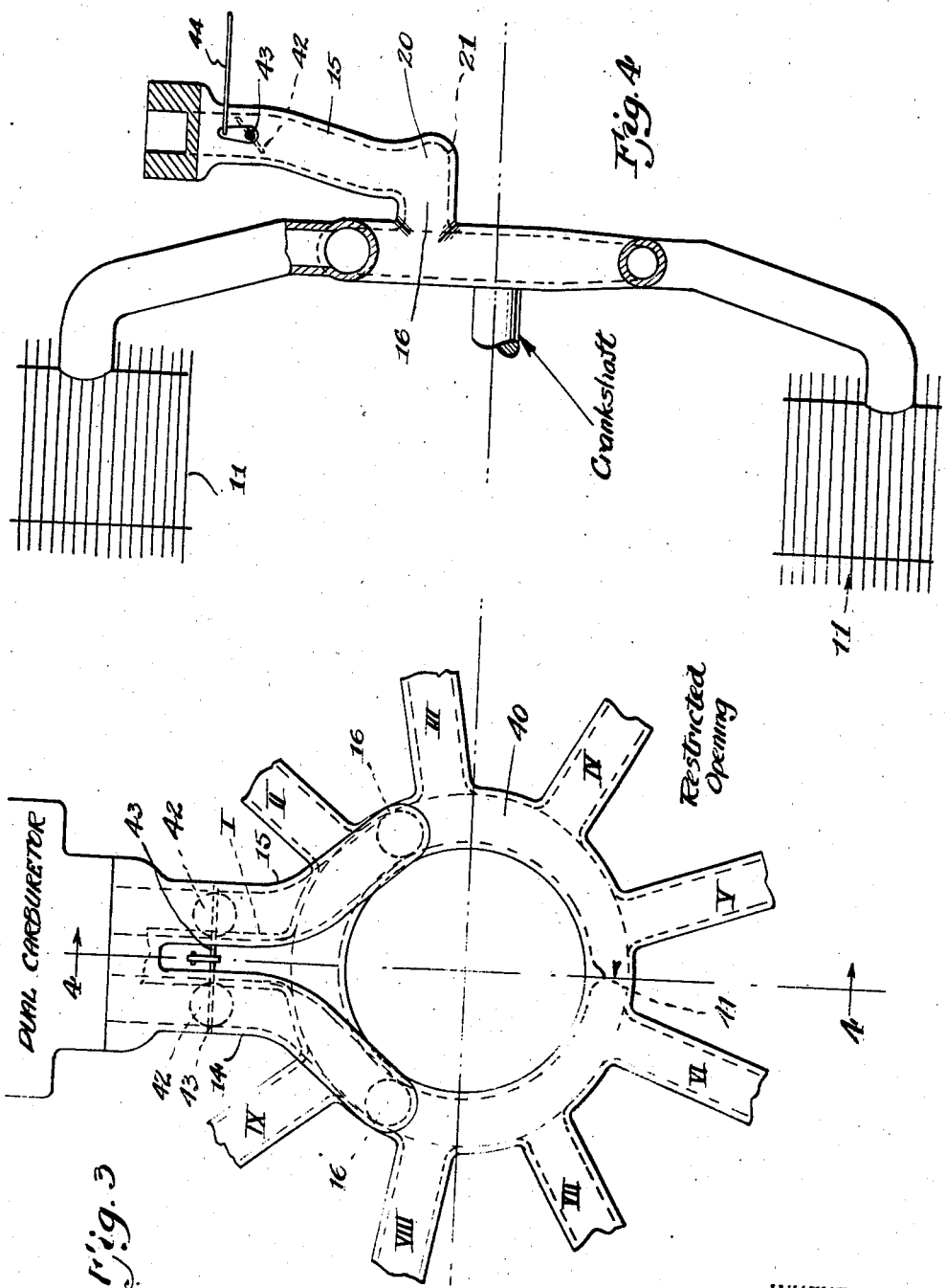

Patented Dec. 21, 1943

2,337,050

UNITED STATES PATENT OFFICE 2,337,050

ENGINE INDUCTION SYSTEM

Thomas Jackson, North Muskegon, Mich., assignor to Continental Motors Corporation, Muskegon, Mich., a corporation of Virginia Application June 17, 1942, Serial No. 447,356

11 Claims. (Cl. 123—52)

My present invention relates to an induction system for an internal combustion engine, and more particularly to an induction system and intake manifold structure, which is especially applicable to an internal combustion engine of the radial cylinder type.

As is generally known the distribution of a fuel mixture to the cylinders of a radial type internal combustion engine is a difficult problem and many types of distributing manifolds have been heretofore proposed. It is especially difficult to obtain a uniform distribution to the cylinders of a heavy duty radial engine due possibly to the large flow of fuel mixture which must be supplied to each of the engine cylinders. It has been proposed that multiple carburetors be employed, each carburetor serving a distribution structure which services only a portion of the engine cylinders. In practice it is difficult to employ multiple carburetors because of mechanical difficulties involved in balancing the separate distributing or induction systems.

An object of my present invention is to construct an improved induction system for engines of the radial type by providing an intake manifold structure embodying dual primary conducting portions connected with a dual carburetor, each of said primary conducting portions servicing substantially a half portion of the intake manifold structure, this construction thereby providing for a more uniform distribution of fuel mixture to the engine cylinder.

A further object of my invention is to construct an improved induction system for engines of the radial type by providing an intake manifold structure comprising a dual primary conducting structure constructed for assembly with a dual carburetor and comprising diverging conducting portions or arms which are symmetrically arranged and connected with an annular ring like fuel mixture distributing manifold having an intermediate restricting portion to facilitate the distribution of the fuel mixture to the engine cylinders.

For a more detail understanding of my invention, reference may be had to the accompanying drawings illustrating a preferred construction in which like characters refer to like parts throughout the several views and in which:

Fig. 1 is an elevational view of my improved fuel mixture induction system,

Fig. 2 is a vertical sectional view taken substantially on the line 2—2 of Fig. 1, Fig. 3 is a diagrammatic elevational view illustrating the principles of my invention, and Fig. 4 is a sectional view showing diagrammatically the connection of the intake manifold structure with the engine cylinders and taken substantially on the line 4—4 of Fig. 3.

The details of the engine structure do not form any part of the present invention excepting that the present induction system is applicable to an engine 10 of the radial cylinder type, Figs. 1 and 4 illustrating engine cylinders 11 somewhat diagrammatically.

Referring more particularly to Figs. 1 and 2, it will be observed that my improved induction system embodies a dual carburetor 12 connected in any suitable manner with a primary fuel mixture conducting structure 13, which comprises the diverging primary fuel mixture conducting portions 14 and 15, that are each connected, as at 16, with an annular ring like manifold structure 17.

This annular manifold structure lies in a plane extending normal to the crankshaft axis 18 and is openly connected with the cylinder port runners designated by the reference characters I to IX inclusive, suitable piping or other connections 19 connecting these port runners with the engine cylinders. The primary conducting pipes 14 and 15 preferably lie in a plane extending substantially parallel to the plane of an annular manifold pipe 17 and terminate in an elbow 20 that extends normal to the plane of the manifold and terminates in the connection 16. This elbow section 20 is preferably constructed to provide a recessed pocket 21 which becomes filled with fuel mixture and eliminates much of the frictional losses encountered by turning the fuel mixture flow around the corner. The flow of fuel mixture around this bend assumes a path having a limit of extent as indicated by the dot and dash line 22 in Fig. 2, and thus facilitates the conduction of a fuel mixture to the annular manifold structure with a minimum of frictional losses.

It will be noted that the primary fuel mixture conducting portions or pipes 14 and 15 are symmetrical with respect to the vertical longitudinal engine plane, and they terminate in outlets 16, which are substantially diametrically opposite. The primary conducting portion or pipe 14 serves a half portion 17a of the annular manifold structure while the primary conducting portion or pipe 15 serves the other half portion 17b of the annular manifold structure. The port runners I, II, III, IV and V draw their supply of fuel mixture from the half portion 17b of the annular manifold structure while port runners VI, VII, VIII and IX as well as port runner I, draw their fuel mixture from the half portion 17a of the annular manifold structure. Intermediate the port runners V and VI it will be observed that the half portions 17a and 17b are connected by a restricted opening 25 which is as shown in Fig. 2 of considerable less cross-sectional area than the area A of the remaining portion of the annular manifold structure. This restricted opening serves to balance the manifold and provide for uniform distribution of the fuel mixture to the various port runners.

It will be noted that the intake manifold structure is constructed of a casting carrying an annular flange 30 connected by an annular web 31 with the port runner portions or pipes I to IX inclusive and to a wall portion or web 32, which supports the annular manifold structure 17 and preferably carries various bearing portions that are adapted for supporting various moving parts of the engine. Preferably, I indicate these bearings as a crankshaft bearing 33, intermediate cam bearing 34, and a fuel pump and tachometer drive shaft bearing 35.

It will be observed that the restricted area B designated by reference character 25 is formed between the bearings 34 and 35.

Referring more particularly to Figs. 3 and 4 it will be observed that the construction is substantially similar to that illustrated in Figs. 1 and 2 except that the annular manifold structure 40 is, in this case, progressively reduced in cross-sectional area from port runners III to V and from VIII to VI, and that intermediate the port runners V and VI there is provided a restricted opening 41 similar to the restricted opening 25 in Fig. 1. The diverging primary fuel mixing portions or pipes 14 or 15 are substantially similar to those illustrated in Fig. 1 excepting that there is shown in these pipes the butterfly valves 42 preferably mounted on a common shaft 43 and simultaneously actuated by a conventional lever and link structure 44. In the construction illustrated in Figs. 1 and 2 the throttle control is preferably included in the dual carburetor construction.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:

1. An induction system for an internal combustion engine of the type having radially disposed cylinders, and comprising, an annular continuous full circle manifold structure provided with a plurality of radially disposed outlet conducting portions respectively connected with each of said engine cylinders and having spaced inlet ports, and a primary fuel mixture conducting structure comprising dual passages of the type extending generally downwardly, and a dual carburetor connected with said dual fuel mixture conducting structure.

2. An induction system for an internal combustion engine of the type having radially disposed cylinders, and comprising, an annular continuous full circle manifold structure provided with a plurality of radially disposed outlet conducting portions respectively connected with each of said engine cylinders and having spaced inlet ports, and a primary fuel mixture conducting structure comprising a pair of diverging primary conducting portions substantially symmetrically constructed relative to a vertical longitudinal engine plane, and a dual carburetor connected with said conducting portions.

3. An induction system for an internal combustion engine of the type having radially disposed cylinders, and comprising, an annular continuous full circle manifold structure provided with a plurality of radially disposed outlet conducting portions respectively connected with each of said engine cylinders and having spaced inlet ports, and a primary fuel mixture conducting structure comprising a pair of diverging primary conducting portions each serving approximately a half portion of said annular manifold structure.

4. An induction system for an internal combustion engine of the type having radially disposed cylinders, and comprising, an annular ring like manifold structure provided with a plurality of radially disposed outlet conducting portions respectively connected with each of said engine cylinders and having spaced inlet ports, and a primary fuel mixture conducting structure comprising a pair of diverging primary conducting portions each serving approximately a half portion of said annular manifold structure, each said manifold half portion openingly connected with each other by a restricted opening.

5. An induction system for an internal combustion engine of the type having radially disposed cylinders, and comprising, an annular ring like manifold structure provided with a plurality of radially disposed outlet conducting portions respectively connected with each of said engine cylinders and having spaced inlet ports, and a primary fuel mixture conducting structure comprising a pair of diverging primary conducting portions each serving approximately a half portion of said annular manifold structure, said diverging conducting portions contained substantially in a plane extending parallel to the plane of the annular manifold and terminating in an elbow portion operable to conduct the fuel mixture to said annular manifold and introduce said fuel mixture therein substantially normal to the direction of fuel mixture flow in said annular manifold.

6. An induction system for an internal combustion engine of the type having radially disposed cylinders, and comprising, an annular ring like manifold structure provided with a plurality of radially disposed outlet conducting portions respectively connected with each of said engine cylinders and having spaced inlet ports, and a primary fuel mixture conducting structure comprising a pair of diverging primary conducting portions each serving approximately a half portion of said annular manifold structure, said diverging conducting portions contained substantially in a plane extending parallel to the plane of the annular manifold and terminating in an elbow portion operable to conduct the fuel mixture to said annular manifold and introduce said fuel mixture therein substantially normal to the direction of fuel mixture flow in said annular manifold, said elbow portion having an enlarged cross-section at the bend.

7. An induction system for an internal combustion engine of the type having radially disposed cylinders, and comprising, an annular ring like manifold structure provided with a plurality of radially disposed outlet conducting portions respectively connected with each of said engine cylinders and having spaced inlet ports, and a primary fuel mixture conducting structure comprising a pair of diverging primary conducting portions each serving approximately a half portion of said annular manifold structure, said diverging conducting portions contained substantially in a plane extending parallel to the plane of the annular manifold and terminating in an elbow portion operable to conduct the fuel mixture to said annular manifold and introduce said fuel mixture therein substantially normal to the direction of fuel mixture flow in said annular manifold, said elbow portion constructed with an enlarged pocket at the bend on the external wall at the bend to minimize friction losses.

8. An induction system for an internal combustion engine of the type having radially disposed cylinders, and comprising, an annular ring like manifold structure provided with a plurality of radially disposed outlet conducting portions respectively connected with each of said engine cylinders and spaced inlet ports, and a primary fuel mixture conducting structure comprising a pair of diverging primary conducting portions each serving approximately a half portion of said annular manifold structure, and interconnected throttle means for controlling fuel mixture flow to each of said primary conducting portions.

9. An induction system for an internal combustion engine of the type having radially disposed cylinders, and comprising, an annular ring like manifold structure provided with a plurality of radially disposed outlet conducting portions respectively connected with each of said engine cylinders and having spaced inlet ports, and a primary fuel mixture conducting structure comprising a pair of diverging primary conducting portions each serving approximately a half portion of said annular manifold structure, said diverging conducting portions contained substantially in a plane extending parallel to the plane of the annular manifold and terminating in an elbow portion operable to conduct the fuel mixture to said annular manifold and introduce said fuel mixture therein substantially normal to the direction of fuel mixture flow in said annular manifold, and interconnected throttle means for each of said primary conducting portions.

10. An induction system for an internal combustion engine of the type having radially disposed cylinders, and comprising, an annular ring like manifold structure provided with a plurality of radially disposed outlet conducting portions respectively connected with each of said engine cylinders, said induction system including a dual carburetor and a pair of down-draft diverging primary fuel mixture conducting portions each of which respectively terminate in open unrestricted communication with a half portion of said annular manifold structure.

11. An induction system for an internal combustion engine of the type having radially disposed cylinders, and comprising, an annular ringlike manifold structure provided with a plurality of radially disposed outlet conducting portions respectively connected with each of said engine cylinders, said induction system including a dual carburetor and a pair of down-draft diverging primary fuel mixture conducting portions respectively terminating in open unrestricted communication with a half portion of said annular manifold structure, said pair of primary fuel mixture conducting portions lying for the most part in a common plane extending substantially parallel with the plane of the annular manifold structure.

THOMAS JACKSON.